Aug. 21, 1945.   M. WATTER   2,383,173
AIRPLANE SEAT
Filed Oct. 29, 1942   7 Sheets-Sheet 1

INVENTOR
Michael Watter.
BY John P. Tarbox
ATTORNEY

Aug. 21, 1945.   M. WATTER   2,383,173
AIRPLANE SEAT
Filed Oct. 29, 1942   7 Sheets-Sheet 4

INVENTOR
Michael Watter
BY John P Tarbox
ATTORNEY

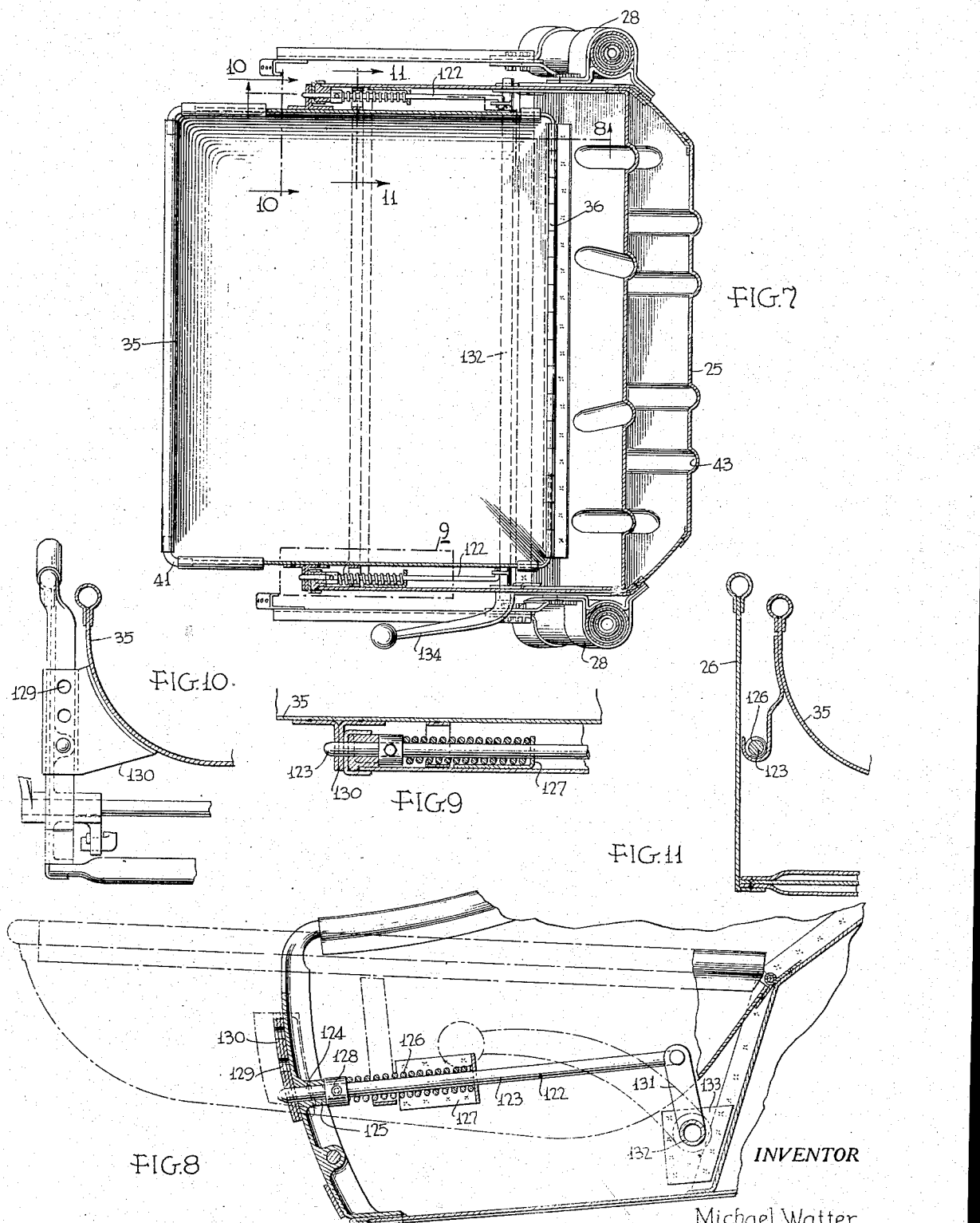

Aug. 21, 1945.  M. WATTER  2,383,173
AIRPLANE SEAT
Filed Oct. 29, 1942   7 Sheets-Sheet 6

INVENTOR
Michael Watter
BY John P Tarbox
ATTORNEY

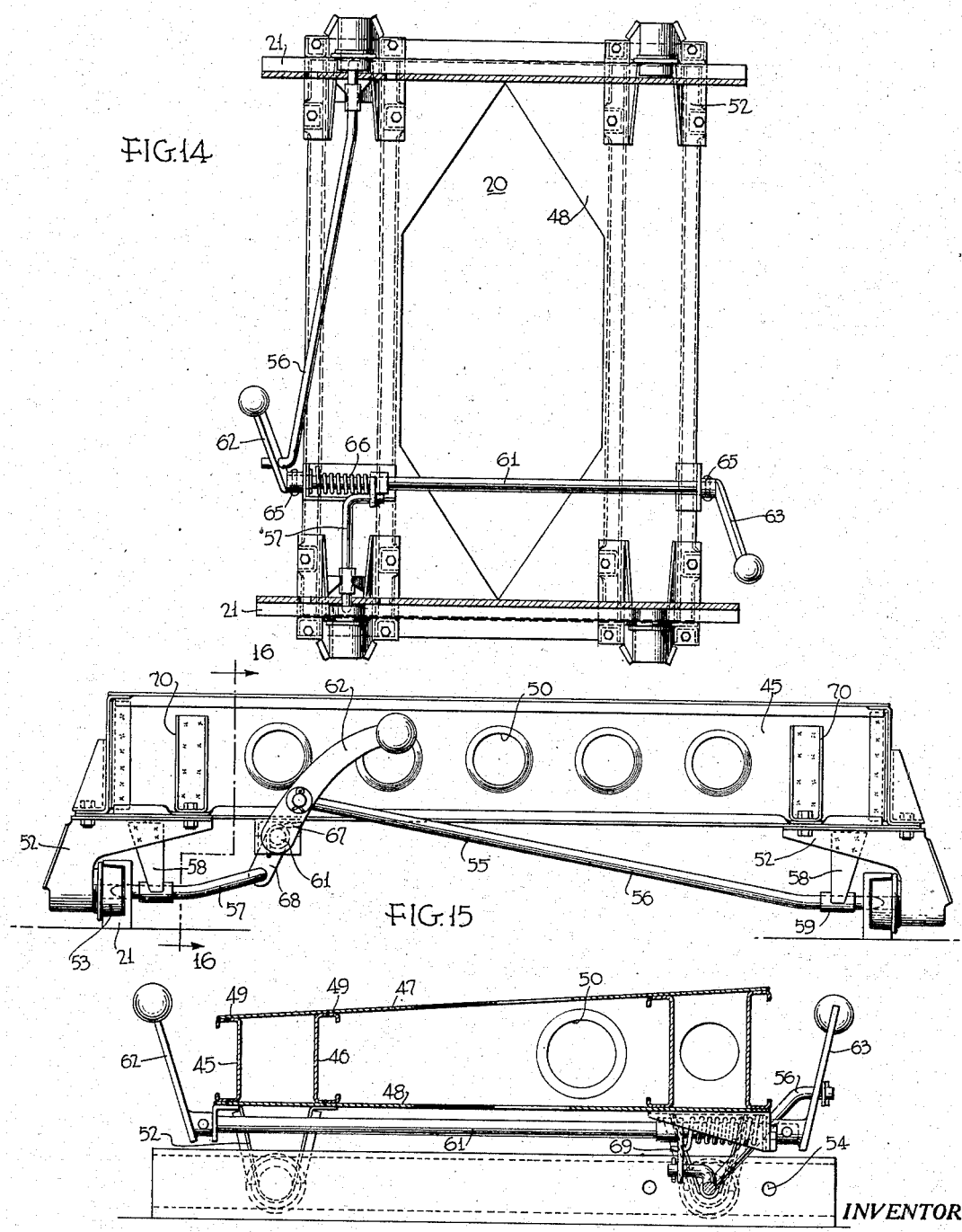

Patented Aug. 21, 1945

2,383,173

UNITED STATES PATENT OFFICE 2,383,173

AIRPLANE SEAT

Michael Watter, Philadelphia, Pa., assignor to Edward G. Budd Manufacturing Company, Philadelphia, Pa., a corporation of Pennsylvania Application October 29, 1942, Serial No. 463,762

4 Claims. (Cl. 155—5)

This invention relates to adjustable seats for airplanes and to adjustable seats particularly adaptable for use of bombardiers in large bombing planes so that they may more readily adjust themselves with reference to the bomb sights and when not over the target adjust the seat to a more comfortable resting position.

It is an object of the present invention to provide an adjustable seat which is of simple construction and so compact that its operating mechanisms will take up little space in excess of the space consumed by the main part of the seat.

It is another object of the invention to provide an adjustable seat which has many-fold adjustments in order that the same will be particularly adaptable for use of a bombardier in action and at the same time have such adjustments as to provide a comfortable seat for resting.

It is still another object of the invention to provide a support for the seat proper of such type that the resilient means for lifting the seat is carried or concealed within the seat struts and wherein the seat struts themselves are connected to a sliding mounting element for fore and aft pivotal adjustment to give to the bombardier means for adjusting the seat fore and aft and particularly aft when the seat has been lowered in order that he may be comfortable for resting with his legs on the floor and free of the forward edge of the seat.

According to the present invention there has been provided a bombardier's seat which has a multiple adjustment all of which makes the seat particularly adaptable for use when the bombardier is locating himself over the bomb sight and wherein the seat is adjustable vertically and rearwardly to render the seat adaptable for rest. To the floor of the airplane are connected channel members in which is slidable for fore and aft movement a seat base or mounting element onto which are connected for fore and aft adjustment the seat props having on their upper ends the seat proper. This seat proper includes a base pan or seating portion which will contain the parachute pack of the bombardier and which is also adjustable up and down to raise or lower the forward edge of the same with respect to the floor of the airplane. The seat props are of the hollow sleeve construction and include an outer sleeve which is connected for pivotal movement to the mount. The sleeves of the two props located at opposite sides of this sliding mount are connected together by a torque tube so that they are swingable in a fore and aft direction in unison. Sliding sleeve element of the props is slidable within the outer sleeve and bears against a compression spring mounted within the props themselves. When adjustment of the seat vertically is desired the sleeves of the props are unlocked and telescoped. If the movement of the seat is in a down direction, the weight of the bombardier will act to compress the spring. If the adjustment is to be vertically upward, the bombardier will release some of his weight from the seat and the spring will automatically raise the seat and stop only when the bombardier again places his weight upon the same. Also associated with the fore and aft slidable mount are latching means for latching the rollers on the bottom end of the mount with respect to the channels within which the rollers operate. Releasing this latch will permit the bombardier to slide his seat forwardly or rearwardly. Arm rests adapted to be moved between vertical and horizontal positions are provided on the seat and may be used by the bombardier when desired.

For other objects and for a better understanding of the invention reference may be had to the following detailed description taken in connection with the accompanying drawings in which:

Figure 7 is a plan view of the seat bucket or horizontal part showing its connection with the seat proper and with parts of the seat proper shown in section, the view being taken along the line 7—7 of Figure 3 and looking in the direction of the arrows thereof;

Figure 8 is a fragmentary view showing the locking mechanism for the seat bucket with relation to the seat proper and with parts of the seat proper shown in section, this view being taken along the line 8—8 of Figure 7 and looking in the direction of the arrows thereof;

Figure 9 is a detail view in section of a portion of the seat bucket lock mechanism taken in the broken-line area 9 of Figure 7;

Figure 10 is a fragmentary detail view in elevation of the lock mechanism for the bucket looking at the forward portion thereof and in the direction of the arrows 10—10 of Figure 7;

Figure 11 is a cross-sectional view of the same lock mechanism looking in the direction of the arrows 11—11 of Figure 7;

Figure 14 is a plan view looking up into the bottom of the sliding mount and in the direction of the arrows 14—14 of Figure 3;

Figure 15 is a rear view of the sliding mount and illustrating part of its latch mechanism for connecting the mount with the channels; and Figure 16 is a sectional view in elevation of the sliding mount taken in the direction of the arrows 16—16 of Figure 15.

Figure 1:
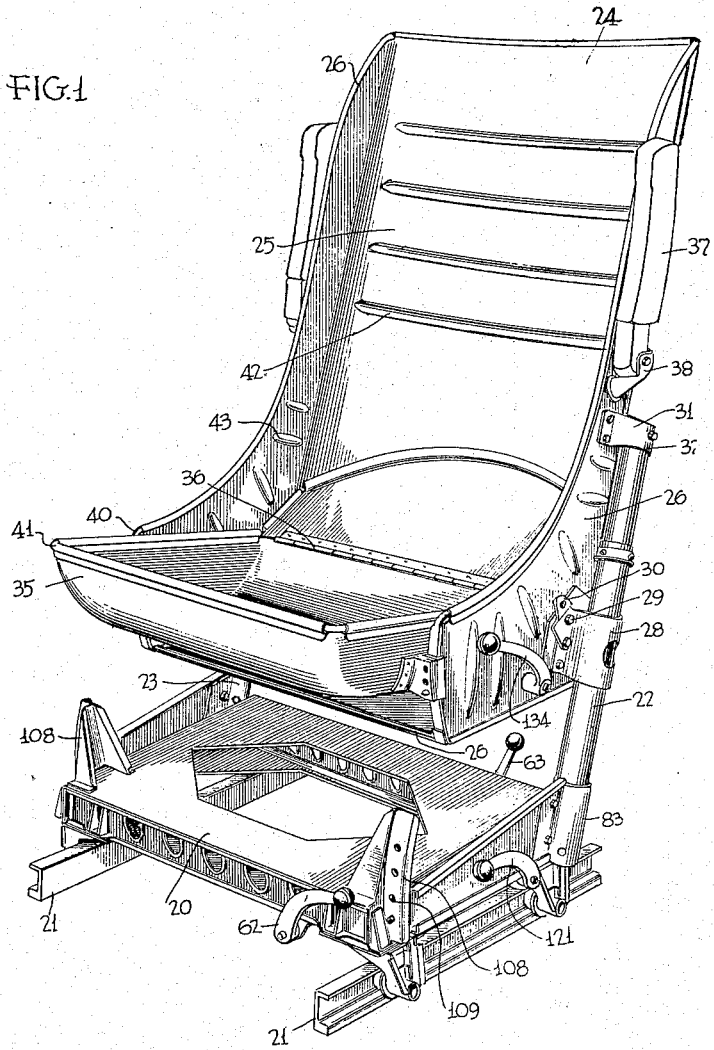
Figure 1 is a perspective view of the bombardier's seat of the present invention showing several of the adjusting levers.

Referring now to the figures, there is shown generally a sliding mount or mounting element 20 adapted for fore and aft sliding movement on spaced channel elements 21 adapted for securing the seat to the floor of an airplane. Connected to the sliding mount 20 for fore and aft pivotal adjustment are vertically extending telescoping seat props 22. These seat props 22 carry on their upper ends the main or back part 24 of the seat which includes a back rest 25 with side portions 26 and a base 27. On the lower end of the main part 24 of the seat and on each side thereof there are connected sliding guides 28. These sliding guides are connected to the side portions 26 of the seat by means of bolts 29 and each has associated therewith a lug 30 with a hole therein to which the bombardier may attach his seat belt. These sliding guides 28 slide on the props. The connection of the seat to the upper end of the prop is made by means of an outwardly extending lug 31 attached to the side portion by means of bolts 32. As viewed particularly in Figure 13, it will be noted that this lug 31 has a sleeve portion 33 adapted to receive the round end of the prop 22. A bolt means 34 extends through the sleeve 33 and through the prop to permanently secure the same together. In the lower portion of the seat 24 is hinged a bucket 35 in the manner indicated at 36. This hinging is such that up and down adjustment of the bucket is had with respect to the back portion 25 of the seat. The bucket is so shaped as to receive the folded parachute carried by the bombardier so that he sits on it, the same thereby serving as a cushion.

Figure 2:
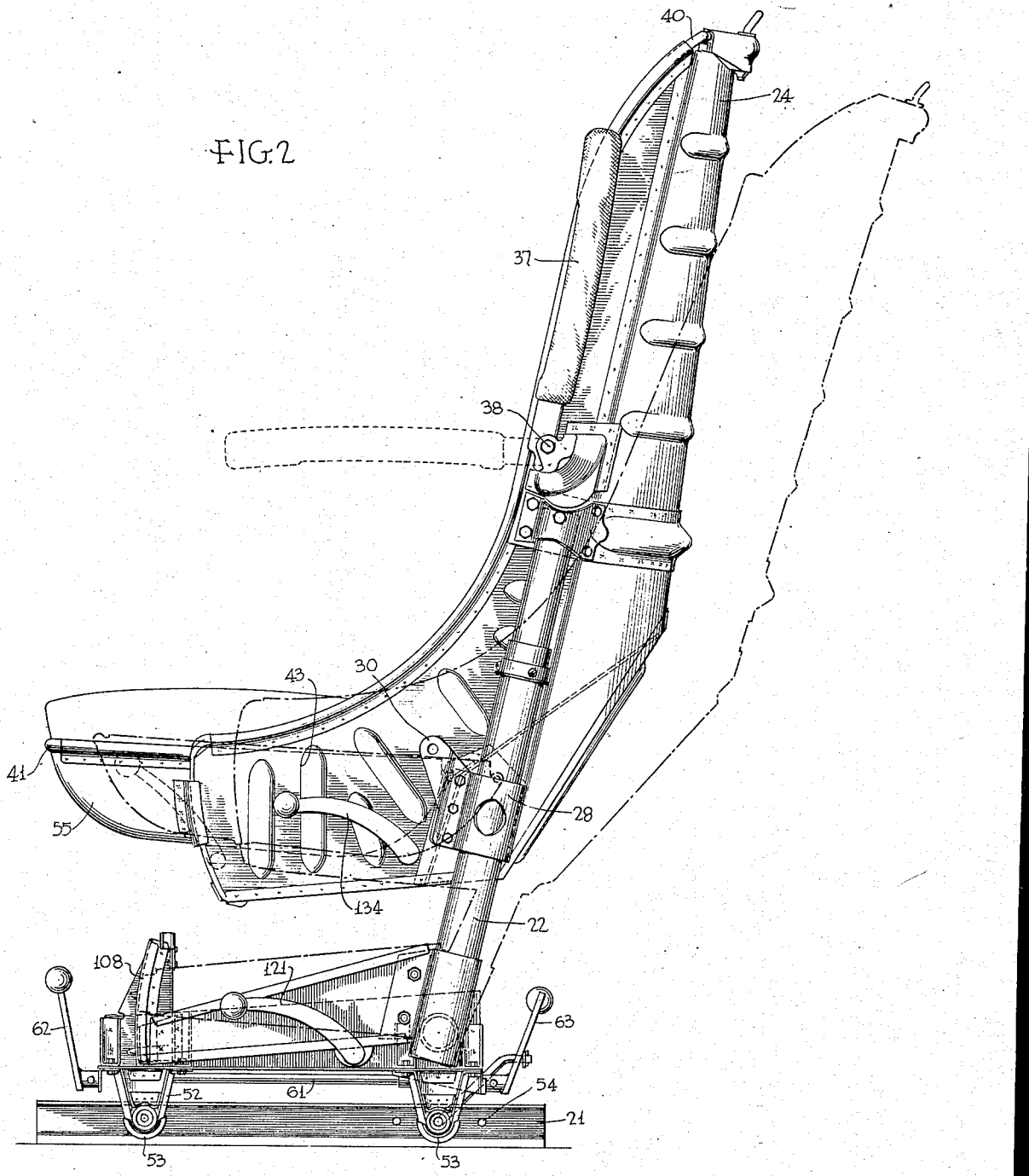
Figure 2 is a side view of the seat, showing in dotted lines the same when adjusted to a rearward or inclined position.

On the side portions 26 are mounted for adjustment the resting arms 37 which are pivotal on brackets 38. As viewed in Figure 2 it will be noted that these arms may be lowered to the dotted line position shown therein where they can serve as an arm rest for the bombardier when the seat is adjusted rearwardly to the resting position.

The top part of the back 25 and the edges of the side portions 26 are reinforced at their edges by a metal rod 40 which extends therearound. The adjustable bucket portion 35 is similarly reinforced by a rod 41 extending around its top edge. The main part 24 of the seat may be further reinforced by indentations 42 and, as well, its side portions may be reinforced by strengthening indentations 43.

Referring now particularly to Figures 14, 15 and 16, there is shown the sliding mount and its latch mechanism for retaining the mount relative to the channels 21 carried on the floor of the airplane. This mount is made up of thin sheet metal and to provide a rigid and reinforced construction, it consists generally of opposing channels 45 and 46 and of top and bottom sheets 47 and 48. Each of the channels have flange portions 49 for their attachment with the top and bottom sheets 47 and 48. There are pairs of these channels 45 and 46 spaced longitudinally of the seat as shown more clearly in Figure 16. In order to lighten the construction there are provided lightening holes 50 in the various parts of the same.

Figure 3:
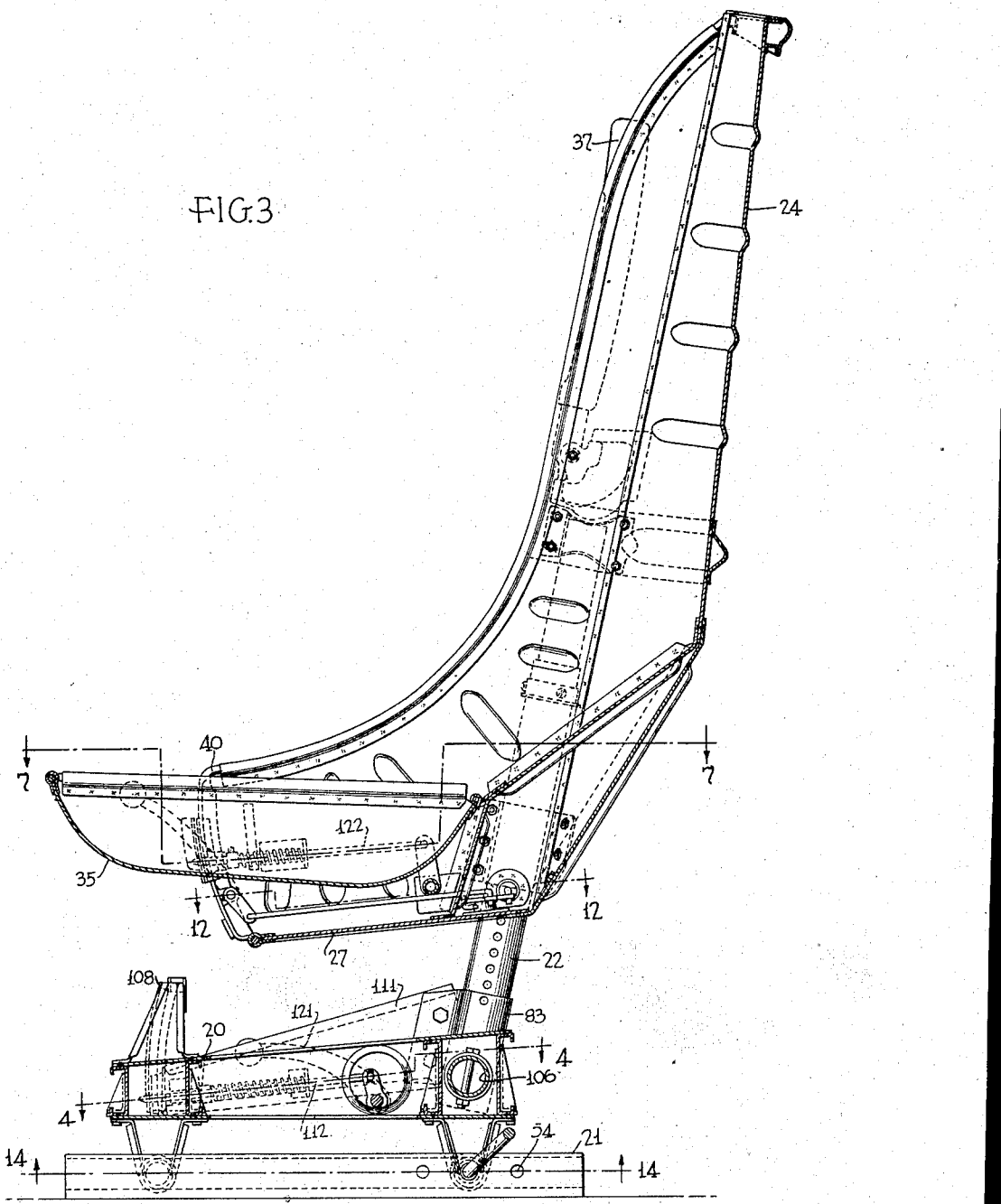
Figure 3 is an elevational view in section taken substantially through the middle of the seat.
Figure 4:
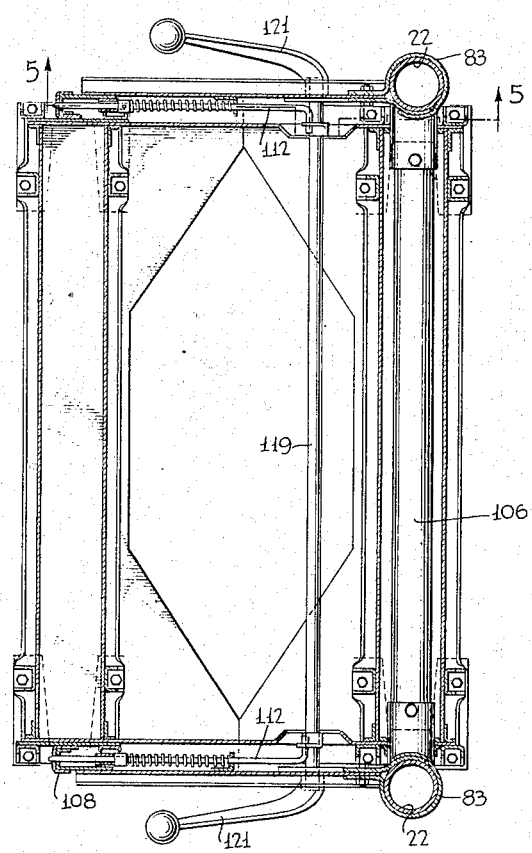
Figure 4 is a plan view of the slidable seat mounting element with some of the parts connected thereto shown in section, the torque tube interconnecting the telescoping props being clearly shown.
Figure 6:
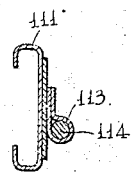
Figure 6 is a detail view in section of the latch mechanism shown in Figure 5 and taken along the line 6—6 thereof.

To the bottom of this construction there are respectively attached on each of the four corners thereof depending brackets 52 which carry respectively supporting rollers 53 adapted to ride in the channels 21. As viewed in Figures 2 and 3, it will be noted that there is a series of holes 54 located in the channels adjacent their rearward ends and adapted for the purpose of adjusting the mount with its seat thereon to different fore and aft positions in the airplane. Carried on the bottom of the mount is a manually manipulable latch means, indicated generally at 55, for retaining the mount in its adjusted positions.

This retaining mechanism includes laterally extending rods 56 and 57 pointed at their outer ends and supported on the brackets 52 by depending lugs 58. The lower ends of the depending lugs each contains a sleeve 59 through which the rods 56 and 57 are axially slidable. The pointed ends of the rods are lined with holes 60 on the inner end of the supporting rollers, see Figure 13, and as the sliding mount is moved from one position to another so that the pointed ends will be in alignment with any one of the holes 54 they may be extended through the channel holes and into the openings 60 on the inner ends of the supporting rollers 53.

The rods 56 and 57 connect at their opposite ends with a spring-biased shaft 61 extending longitudinally of the mount and having an operating arm 62 accessible to the bombardier at the forward part of the mount and also an operating lever 63 accessible to the bombardier at the rearward part of the mount. When the bombardier is in the inclined or resting position the rearward operating arm 63 would likely be more accessible to him in order that fore and aft adjustment of the seat could be readily had. The rod 56 is connected to the shaft 61 through the arm 62. The lever arms 62 and 63 are keyed to the shaft 61 respectively by pins 65. The biasing means for the shaft 61 takes the form of a coil spring 66 wrapped therearound and the ends thereof engaging respectively the bottom sheet 48 of the mount in the manner indicated at 67 and an arm 68 in the manner indicated at 69, the arm 68 connecting with the rod 57. Reinforcing gussets 70 may be attached to the channel elements 45 to give rigidity to the structure in the region of the connection of the depending brackets 52 with the channels.

Figures 12, 13:
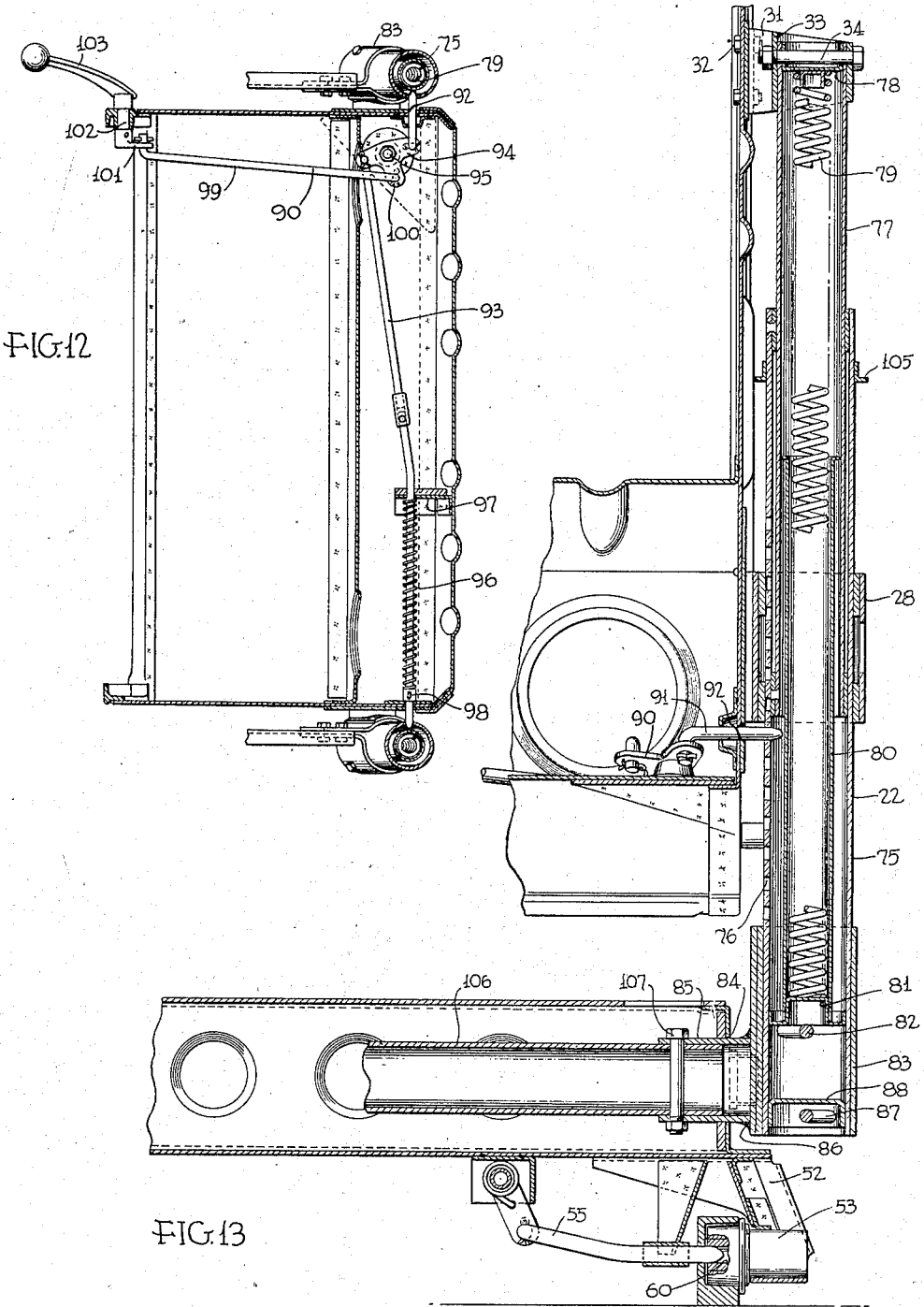
Figure 12 is a fragmentary and sectional view of the base of the seat proper looking in the direction of the arrows 12—12 of Figure 3.
Figure 13 is an enlarged sectional view of one of the telescoping props for the seat proper with the latch mechanism for retaining the sleeves thereof in their adjusted position, also in illustration of the pivotal connection of the telescoping prop with the mount and its torque tube for the connection with the prop at the opposite side of the mount.

Referring now particularly to Figures 12 and 13, description will be made of the seat props 22. Each prop 22 includes an outer sleeve 75 having a series of adjusting holes 76 extending vertically and along its length. Within the sleeve 75 is mounted for sliding movement an inner sleeve 77 on the upper end of which is connected the main part of the seat 24 in the manner described hereinbefore, that is, by means of the bolt 34. The bolt 34 also extends through the flange of a cap member 78 which serves as backing for a compression coil spring 79 which extends downwardly into a sleeve or shell container 80, the bottom end of which is closed by a cap 81. This shell container 81 is restrained against downward movement by means of a bolt 82 which extends through the outer shell 75 at the lower end and which at the same time serves to connect the prop 22 with a supporting sleeve 83 journalled to the sliding mount in the manner as indicated at 84 by means of a transversely extending sleeve 85 weldingly secured to the sleeve 83 as indicated at 86. In order to provide further connection of the prop sleeve 75 with the rotatable sleeve 83, there is provided a second bolt 87 which extends through the closing end cover 88 at the bottom end of the sleeve 75. It should now be apparent that the lower end of the prop 22 is mounted on the sliding mount 20 for pivotal adjustment whereby the prop with the seat attached can be adjusted in fore and aft tilted positions relative to the mount.

Adjacent to the guide 28 and just beneath the same there is carried on the main part 25 of the seat back a manually manipulable latch locking mechanism 90 having a thrust pin 91 at one location adapted for alignment with any one of the series of holes 76. The thrust pin 91 is pointed for this purpose and is carried for sliding movement in a reinforced opening 92 on the side portion 26 for the seat back 25.

The latch mechanism 90, as viewed more clearly in Figure 12, also includes a second thrust pin 93 adapted for insertion into the prop at the opposite side of the seat. The two pins 91 and 93 are connected together by a bell crank 94 which is pivotally connected as indicated at 95 to the bottom of the back part 25 of the seat. On the pin 93 is connected a compression spring 96 adapted to react against a plate 97 fixed to the seat back 25 and against the pin through collar 98 for thrusting the pin 93 and the pin 91 through the bell crank 94 into the holes 76 of the props 22. In order to unlatch the mechanism to make it possible for the bombardier to raise or lower the seat, there is provided a link 99 connected to an arm 100 of the bell crank 94 and to an arm 101 on a pivoted shaft 102 at the right side of the seat on the other end of which shaft there is connected a manual operating arm 103 readily accessible to the bombardier. When this latch mechanism 90 is operated to release the pins 91 and 93, the seat can be raised or lowered. If it is desired to raise the seat, this will be done automatically by the springs 79 upon the bombardier releasing his weight in the seat. If it is desired to lower the seat, weight is applied and the seat will be brought down to the proper location desired by the bombardier. At each instance the inner sleeve 77 will move in and out of the outer sleeve 75. It should now be apparent that there has been provided a spring means for the raising of the seat which is enclosed within the seat prop and out of interference with the other parts of the airplane. By having this arrangement compact room is left for more freedom of the other personnel within the airplane. The seat back 25 carries the guides 28 which will move vertically with the seat over the outer sleeve 75. Vertical movement and disengagement of the inner and outer sleeves is prevented by a stop ring 105 on the upper end of the outer sleeve 75.

Figure 5:
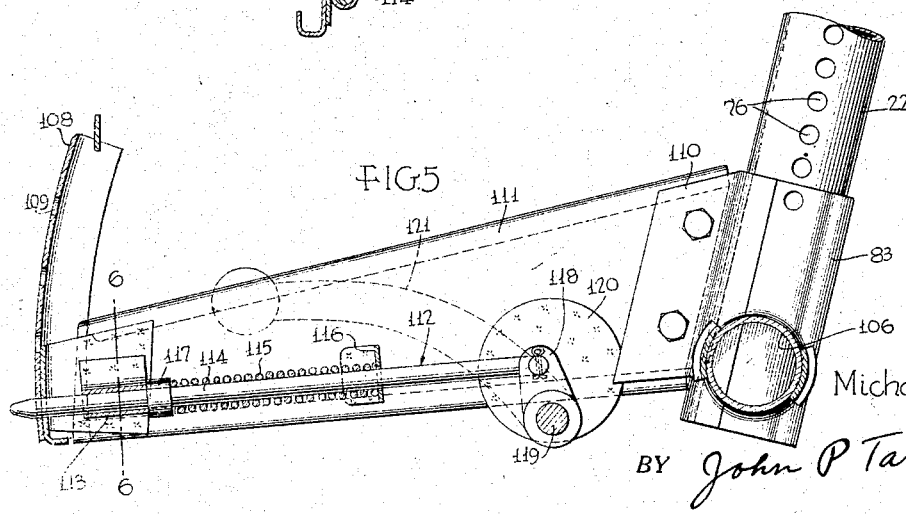
Figure 5 is an enlarged fragmentary view of the latch mechanism for retaining the seat in a fore and aft pivoted position, the view being taken along the line 5—5 of Figure 4 and looking in the direction of the arrows thereof.

Referring now particularly to Figures 1, 5 and 13, it will be noted that the sleeve 85 of the pivotal support 83 has connected to it a torque tube 106 extending transversely of the seat and secured by means of a bolt 107. This torque tube connects together the pivotal supports 83 for the props 22 so that pivotal movement of the entire seat is given in unison. As a latch means for securing the seat in its pivotally adjusted position there is provided, as shown in Figure 1, a vertically extending arcuate shaped member 108 having a series of holes 109. Rigid with the sleeve 83 is a forwardly extending flange 110 to which is connected a latch mechanism supporting arm 111 carrying a manually manipulable latch mechanism indicated 112. This arm has secured at its outer end a sleeve 113 in which is supported a spring biased thrust pin 114. Surrounding this pin 114 is a compression coil spring 115 adapted to abut against a stop 116 on the arm 111 and against a collar 117 on the pin 114 for the purpose of urging the pin into its locking position with the collar 117 against the sleeve 113. The rearward end of the pin 114 is pivotally connected to a crank arm 118 which is in turn connected with a shaft 119 pivoted on a journal support 120 secured to the arm 111. The shaft 119 extends across the entire bottom of the mount 20 and has on opposite ends of the same the operating levers 121 accessible to the bombardier at both sides thereof. There are both an arcuate member 108 and a pin 114 at each side of the mount 20.

When it is desired to tilt the seat either forwardly or rearwardly the operating lever 121 is manipulated and the pin 114 is withdrawn from one of the holes 109, the seat is tilted in one direction or another until the pin 114 is adjacent another hole 109 and the seat is finally secured in the desired inclined position. It should be apparent particularly from Figure 2 that the seat can take a well inclined resting position for the bombardier, and with the resting arms 37 being adaptable to be lowered the bombardier can rest more easily.

Referring now particularly to Figures 7 to 11 inclusive, there is shown the latch mechanism for the bucket seat 35 which is adjustable relative to the back part of the seat 24, the same being hinged as indicated at 36. The bucket seat 35 is depressed so as to receive the parachute of the pilot which will give him a raised position in the seat proper. On each of the side portions 26 of the back 25, there is provided a latch operating mechanism 122 including a thrust pin 123 supported at its forward end in an opening 124 of a projection 125 carried on the forward edge of the side portion 26. The pin 123 is maintained forwardly by a spring 126 adapted to react against a bracket 127 carried on the side portion 26 and against a collar 128 on the pin 123 itself. The spring 126 will urge the collar 128 against the projection 125 so that the pin when aligned with any one of a series of openings 129 provided in an arcuate projection 130 on the bucket seat 35, will be maintained therein.

In order to release the pin 123 from an opening 129 to provide for a new adjustment of the bucket seat 35, there is provided at the rearward end of the pin and pivotally connected therewith an arm 131 rigid with a shaft 132 pivoted on the back portion 25 on brackets 133. At the left-hand side of the seat is an operating arm 134 accessible to the bombardier for rotating the shaft 132. While but one of the operating mechanisms 122 has been described, it will be apparent that the operating mechanism at the opposite side of the seat is of similar construction and that due to the fact that the shaft 132 extends to the opposite side of the seat, it will serve to effect operation of the latch mechanism at that side simultaneously with the operating mechanism at the opposite side.

It should now be apparent that there has been provided an adjustable seat arrangement particularly adaptable for use of bombardiers inasmuch as the same has associated with it practically every means of adjustment which may be desired by the bombardier so as to properly locate him with respect to the bomb sight and at the same time provide rest when desired, the seat for the latter purpose being adjustable to a rearward position and inclined to a comfortable position. There is a plurality of means for adjusting in both vertical and horizontal planes, whereby due to the combined effect more accurate adjustment will be had. It should also be apparent that the entire construction is simple and compact, that the spring mechanism serving to adjust the seat vertically is enclosed within the seat props themselves, and thus removed from locations whereby they would be of hindrance to the personnel in the airplane. It should also be apparent that the construction is arranged to be rigid and that the lock mechanisms are positive in their grip with the relatively movable parts.

While various changes may be made in the detail construction, it shall be understood that such changes shall be within the spirit and scope of the present invention as described by the appended claims.

What is claimed is:

1. In an adjustable seat for airplanes, a mounting element having forward and rearward portions, a seat portion, a seat prop for connecting the seat portion to the mounting element, means for connecting the lower end of the seat prop to the rearward portion of the mounting element for pivotal adjustment with respect thereto, an arm on the lower end of the prop carrying a manually manipulable latch element accessible to the seat portion, a vertically extended projection on the forward portion of the mounting element adapted to retain the latch element in a plurality of vertical locations thereon, whereby said seat portion may be retained in fore and aft adjusted positions.

2. In an adjustable seat for airplanes, a mounting element having forward and rearward portions, a pair of laterally spaced seat props, a seat portion carried by and disposed between the seat props, means for connecting the lower ends of the seat props to the rearward portion of the mounting element for fore and aft pivotal adjustment, forwardly extending arms rigidly connected respectively to the props and thereby located at opposite sides of the seat, manually manipulable latch elements carried respectively by the arms and tied together to be operated in unison, and arcuate shaped upwardly extending projections on the forward portion of the mounting element having respectively a series of indentations along its height for receiving the respective latch elements whereby the seat portion may be adjusted and retained in a plurality of fore and aft adjusted positions.

3. In an adjustable seat for airplanes, a mounting element, a seat portion, a seat prop connecting said seat portion to the mounting element, means for connecting the seat prop adjacent one end of the mounting element for pivotal adjustment with respect thereto, an arm on said prop extending longitudinally of the mounting element therefrom and carrying a manually manipulable latch element accessible to the seat portion, a vertically extending projection adjacent the end of said mounting element remote from the pivotal connection of the prop thereto and adapted to retain the latch element in a plurality of vertical locations thereon, whereby the seat portion may be retained in a plurality of adjusted positions.

4. In an adjustable seat for airplanes, a mounting element, a seat portion, a seat prop connecting the seat portion to the mounting element, means for connecting said prop to the mounting element for pivotal adjustment with respect thereto in fore and aft direction, an arm rigidly secured to the prop extending laterally therefrom in fore and aft direction and carrying a manually manipulable latch element accessible to the seat portion, and a generally vertically extending projection on said mounting element having means thereon cooperating with said arm to guide it and having further means thereon operative to retain the latch element in a plurality of vertical locations thereon and thereby lock the seat prop in any of a plurality of adjusted positions.

MICHAEL WATTER.